United States Patent
Ehlers et al.

(10) Patent No.: US 10,933,617 B2
(45) Date of Patent: Mar. 2, 2021

(54) METHOD FOR PRODUCING A METAL COMPOSITE MATERIAL WITH AN EMBEDDED FUNCTIONAL STRUCTURE AND CORRESPONDING METAL COMPOSITE MATERIAL

(71) Applicants: THYSSENKRUPP STEEL EUROPE AG, Duisburg (DE); thyssenkrupp AG, Essen (DE)

(72) Inventors: Jan-Eric Ehlers, Dortmund (DE); Roman Glass, Dortmund (DE); Bernd Schuhmacher, Dortmund (DE)

(73) Assignees: THYSSENKRUPP STEEL EUROPE AG, Duisburg (DE); thyssenkrupp AG, Essen (DE)

( * ) Notice: Subject to any disclaimer, the term of this patent is extended or adjusted under 35 U.S.C. 154(b) by 128 days.

(21) Appl. No.: 15/555,150

(22) PCT Filed: Mar. 1, 2016

(86) PCT No.: PCT/EP2016/054320
§ 371 (c)(1),
(2) Date: Sep. 1, 2017

(87) PCT Pub. No.: WO2016/139204
PCT Pub. Date: Sep. 9, 2016

(65) Prior Publication Data
US 2018/0050531 A1    Feb. 22, 2018

(30) Foreign Application Priority Data
Mar. 4, 2015   (DE) ..................... 10 2015 103 141.8

(51) Int. Cl.
B32B 37/14    (2006.01)
B32B 15/08    (2006.01)
(Continued)

(52) U.S. Cl.
CPC .............. *B32B 37/142* (2013.01); *B32B 3/08* (2013.01); *B32B 3/14* (2013.01); *B32B 3/18* (2013.01);
(Continued)

(58) Field of Classification Search
CPC .... B32B 3/18; B32B 3/08; B32B 3/30; B32B 27/06
See application file for complete search history.

(56) References Cited

U.S. PATENT DOCUMENTS

| 2009/0075027 | A1 | 3/2009 | Tong |
| 2010/0000675 | A1 | 1/2010 | Kim |

(Continued)

FOREIGN PATENT DOCUMENTS

| CN | 1721311 A   | 1/2006 |
| CN | 101218527 A | 7/2008 |

(Continued)

OTHER PUBLICATIONS

Machine Translation of CN 102208464.*

(Continued)

*Primary Examiner* — Christopher T Schatz
(74) *Attorney, Agent, or Firm* — Avant Law Group, LLC

(57) ABSTRACT

A method for producing a metal composite material with an embedded functional structure, in which a build-up of layers comprising a number of layers that are arranged one on top of the other in the vertical direction is produced and pressed, may involve producing the build-up of layers by providing a lower layer comprising a metal substrate, arranging at least in certain portions over the lower layer in a vertical direction an intermediate layer that is in contact with the lower layer, and arranging one or more functional structures respectively in a portion of the build-up of layers. To reduce the risk of increased degradation, before the pressing, the build-up of (Continued)

layers may have the same thickness in the respective portion with the functional structure as in the remaining build-up of layers. Further, a metal composite material with an embedded functional structure may be produced by such a method.

11 Claims, 18 Drawing Sheets

(51) Int. Cl.
  *B32B 7/12* (2006.01)
  *B32B 3/30* (2006.01)
  *B32B 27/08* (2006.01)
  *B32B 3/14* (2006.01)
  *B32B 3/08* (2006.01)
  *B32B 3/18* (2006.01)
  *B32B 15/04* (2006.01)
  *B32B 15/18* (2006.01)

(52) U.S. Cl.
  CPC .................. *B32B 3/30* (2013.01); *B32B 7/12* (2013.01); *B32B 15/043* (2013.01); *B32B 15/08* (2013.01); *B32B 15/18* (2013.01); *B32B 27/08* (2013.01); *B32B 2250/03* (2013.01); *B32B 2255/06* (2013.01); *B32B 2305/34* (2013.01); *B32B 2307/202* (2013.01); *B32B 2307/412* (2013.01); *B32B 2307/538* (2013.01); *B32B 2457/00* (2013.01); *B32B 2457/10* (2013.01); *B32B 2457/12* (2013.01); *B32B 2457/20* (2013.01)

(56) References Cited

U.S. PATENT DOCUMENTS

| 2010/0275992 | A1 | 11/2010 | Watanabe |
| 2012/0111407 | A1 | 5/2012 | Rummens |
| 2013/0210186 | A1 | 8/2013 | Hiraike |
| 2016/0193779 | A1 | 7/2016 | Koch |

FOREIGN PATENT DOCUMENTS

| CN | 101237008 A | 8/2008 |
| CN | 101678993 A | 3/2010 |
| CN | 101685838 A | 3/2010 |
| CN | 101979301 A | 2/2011 |
| CN | 102208464 A | 10/2011 |
| CN | 203048360 U | 7/2013 |
| CN | 103303769 A | 9/2013 |
| DE | 102012103793 A | 10/2013 |
| DE | 102013013495 A | 2/2015 |
| JP | 2004063673 A | 2/2006 |
| WO | 0118748 A | 3/2001 |
| WO | 2005099310 A | 10/2005 |
| WO | 2008031657 A1 | 3/2008 |
| WO | 2009091068 | 1/2009 |

OTHER PUBLICATIONS

English Translation of International Search Report issued in PCT/EP2016/054320, dated Apr. 22, 2016 (dated May 9, 2016).
English machine translation of DE102012103793.
English translation of "Solar Photovoltaic Technology," edited by Wang Zhijuan, Zhejiang Science and Technology Press, 1st edition, pp. 56-58, "Topic 3: Production process of solar cell module," dated Sep. 30, 2009.
Japanese Application No. 2017545939, Office Action dated Jan. 28, 2020, 17 pages.

* cited by examiner

METHOD FOR PRODUCING A METAL COMPOSITE MATERIAL WITH AN EMBEDDED FUNCTIONAL STRUCTURE AND CORRESPONDING METAL COMPOSITE MATERIAL

CROSS REFERENCE TO RELATED APPLICATIONS

This application is a U.S. National Stage Entry of International Patent Application Serial Number PCT/EP2016/054320, filed Mar. 1, 2016, which claims priority to German Patent Application No. DE 10 2015 103 141.8 filed Mar. 4, 2015, the entire contents of both of which are incorporated herein by reference.

FIELD

The present disclosure generally relates to metal composite materials, including methods for producing metal composites that have embedded functional structures.

BACKGROUND

Metal composite materials, in particular steel composite materials, are used, for example, in conjunction with applied thin-film photovoltaic modules. In the course of the production of the metal composite material, functional modules or layers, hereinafter referred to as functional structures, are thereby embedded in the build-up of layers. They may also be referred to as embedded structures. Such structures are known from the electronics and semi-conductor industries (WO 2005/099310 A2).

When functional structures, for example thin-film photovoltaic modules, are applied to a metal substrate, in particular to a steel substrate, local elevations or ridges are formed in the area of the functional structures which are subjected to increased mechanical stresses during the further processing of the metal substrate, for example during roll lamination, in particular, shear forces, and are therefore subject to increased degradation. The functional structures to be applied are often sensitive to mechanical stresses and may in part be destroyed by them or at least have reduced levels of performance.

The aforementioned problem occurs, for example, when functional structures are applied to a metal substrate, the width of which is smaller than that of the metal substrate, and/or during (intermittent) application of functional structures in the longitudinal direction or production direction.

Thus a need exists for a procedure for producing a metal composite material with an embedded functional structure in which the risk of increased degradation is reduced.

DETAILED DESCRIPTION

Figure 1:
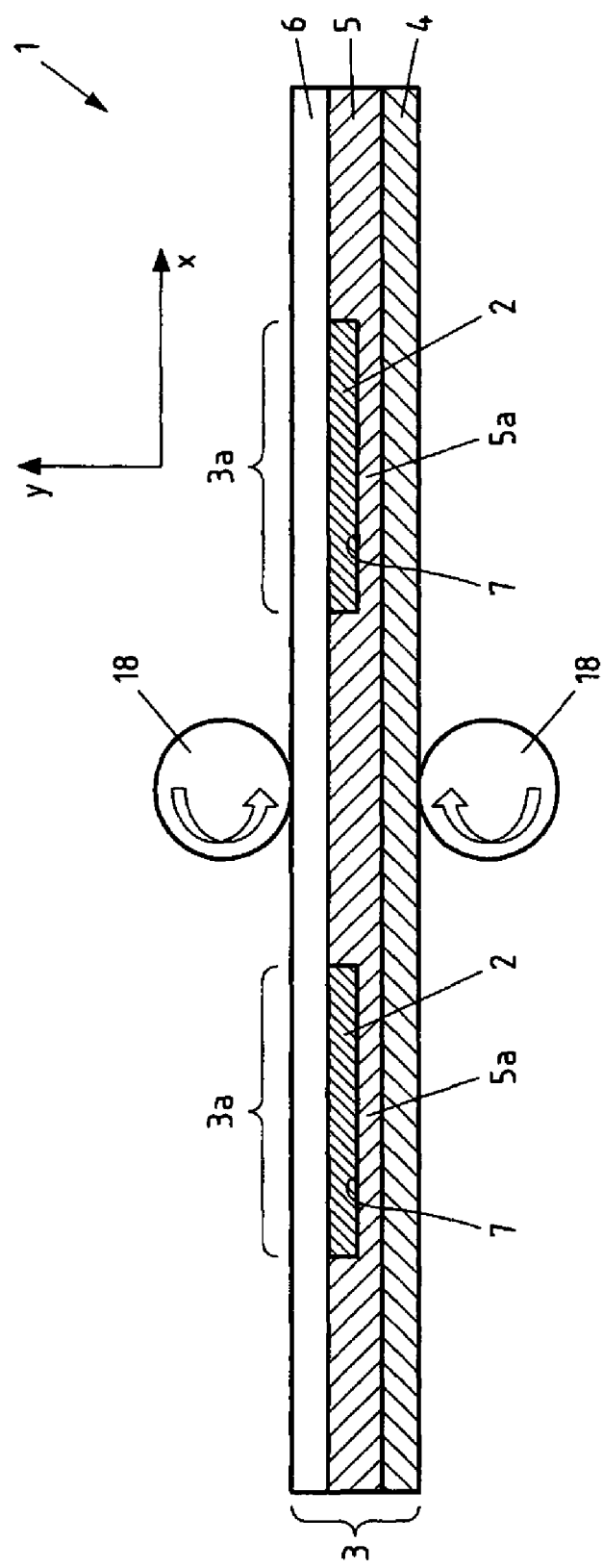
FIG. 1 is a cross-sectional view of an example build-up of layers, wherein an intermediate layer is applied to a lower layer in the form of a carrier film and recesses are embedded in portions that are spaced apart from one another in a longitudinal direction.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to procedures for producing metal composite materials, in particular steel composite materials, with embedded functional structures in which a build-up of layers comprising a number of layers which are arranged one on top of the other in a vertical direction is produced and pressed. The build-up of layers may in some examples be produced by the following steps:

providing a lower layer comprising a metal substrate, in particular a steel substrate, arranging at least in certain portions over the lower layer in the vertical direction an intermediate layer which is touches the lower layer, and arranging one or more functional structures respectively in a portion of the build-up of layers.

The present disclosure further relates to metal composite materials, in particular steel composite materials, with embedded functional structures produced by such procedures.

One way to solve the problems identified further above is by a procedure for producing a metal composite material, in particular a steel composite material with an embedded functional structure, in which a build-up of layers comprising a number of layers which are arranged one on top of the other in the vertical direction is produced and pressed, wherein the build-up of layers is produced by the following steps:

providing a (in relation to the vertical direction) lower layer comprising a metal substrate, in particular a steel substrate, arranging in particular continuously at least in certain portions over the lower layer in the vertical direction an intermediate layer which is in contact with the lower layer, and arranging one or more functional structures respectively in a portion of the build-up of layers (meaning there are portions with and portions without a functional structure in the longitudinal direction and/or transversal direction), in that before and, in particular, also after the pressing, the build-up of layers (to be pressed) has the same thickness in the respective portion with the functional structure, at least in a sub portion or over the entire longitudinal and/or transversal extent of the portion with the functional structure, as the remaining build-up of layers, that means like the portions without a functional structure.

Furthermore, to produce a build-up of layers, an arrangement at least in certain portions of an upper layer, in particular a protective layer, which for example may be configured in the form of an, in particular, transparent barrier film which comprises, for example, a composite comprising at least one polymer layer and at least one ceramic layer, which is preferably gas-impermeable, in particular with respect to water vapor and oxygen, is provided in the vertical direction over the lower layer and in particular over at least one of the functional structures. The respective functional structure is thereby arranged in particular respectively in one portion between the side of the upper layer facing away from the lower layer and the side of the lower layer facing away from the upper layer.

By having the thickness of the build-up of layers in the portion(s) with the functional structure correspond to the thickness in the adjacent portions before the pressing, the mechanical stresses, in particular, shear forces, are reduced to a minimum in the transition area between portions with a functional structure and adjacent portions, whereby the risk of increased degradation is reduced significantly. The thickness of the build-up of layers over its entire longitudinal and/or transversal extent (extension in the longitudinal or transversal direction) is preferably constant before and, in particular, after the pressing. According to the invention, therefore, a functional structure as is known from the electronics and semi-conductor industries, is embedded in a laminate which has a lower layer comprising a metal substrate, in particular a steel substrate, preferably a flat steel-semi-finished part, wherein one or a plurality of recesses or depressions have been provided within the build-up of layers, said recesses or depressions being so big that they can be filled respectively by an embedded functional structure such that, even before the pressing, the build-up of layers has an upper side that is continuously parallel to the underside, that is an upper side without local elevations or ridges. A substrate is a plate-shaped, tabular or band-shaped metal material, preferably steel material, which may be planar or already preformed/profiled.

As stated, the lower layer is a metal substrate, in particular a steel substrate, preferably a steel band and constitutes, in particular, the lower final layer of the build-up of layers, which rests on a lower pressing element or on a conveyor belt belonging to the press during pressing. The optional upper layer constitutes, in particular but not necessarily, the upper final layer which comes into contact with an upper pressing element or conveyor belt belonging to the press during pressing. The area between the lower layer and a functional structure or the upper layer is the so-called intermediate layer, also referred to as core layer. According to the invention, the intermediate layer must not thereby run continuously along the lower layer or between the upper and lower layer, but may also, as stated, only be provided in portions, wherein the upper layer then, in particular, touches the lower layer in adjacent portions thereto.

Various configurations of the procedure are described below.

In accordance with one configuration, it is provided for the intermediate layer to have portions with a recess formed by a reduction of the cross-section (reduction of the thickness), wherein a functional structure is laid (inserted) respectively into the recess, wherein in particular the thickness of the upper layer and/or lower layer is constant.

In accordance with a further configuration, it is provided for the upper layer to have portions with a recess formed by a reduction of the cross-section (reduction of the thickness), wherein a functional structure is laid (inserted) respectively into the recess, wherein in particular the thickness of the lower layer and/or intermediate layer is constant.

In accordance with yet a further configuration, it is provided for the lower layer to have portions with a recess formed by a reduction of the cross-section (reduction of the thickness), wherein a functional structure and a portion of the intermediate layer is laid (inserted) respectively into the recess, wherein in particular the thickness of the upper layer is constant. In particular, it is provided for the upper layer to touch the lower layer.

In accordance with yet a further configuration, it is provided for the intermediate layer to have first portions comprising a first intermediate layer material and adjacent thereto in the longitudinal direction and/or transversal direction second portions comprising a second intermediate layer material that is different to the first intermediate layer material, and/or the upper layer has first portions comprising a first upper layer material and, adjacent thereto in the longitudinal direction and/or the transversal direction, second portions comprising a second upper layer material that is different to the first upper layer material. It is, thereby, conceivable that the first portions of the intermediate layer and upper layer are arranged one on top of the other in the vertical direction and in particular align with each other, wherein a functional structure is arranged respectively in the vertical direction between a first portion of the intermediate layer and a first portion of the upper layer.

In accordance with a further configuration, it is provided for the intermediate layer to have portions comprising a first intermediate layer material, wherein adjacent thereto in the longitudinal direction and/or transversal direction depressions are provided between the lower layer and the upper layer in which a functional structure is arranged respectively.

In accordance with yet another configuration, it is provided for the material of the upper layer to be transparent, continuously or in certain portions, in particular in the first portions comprising the first upper layer material.

In accordance with yet a further configuration, it is provided for the material of the upper layer to consist of at least one film, in particular at least one plastic film, continuously or in certain portions (in relation to the longitudinal and/or transversal direction), in particular in the first portions comprising the first upper layer material, and/or to consist of metal, in particular of flat steel, continuously or in certain portions, in particular in the two portions comprising the second upper layer material.

In accordance with a further configuration, it is provided for the material of the intermediate layer to consist of plastic, in particular flexible plastic, preferably of at least one plastic film or of metal, in particular of steel, preferably of flat steel, continuously or in portions (in relation to the longitudinal and/or transversal direction), in particular in the portions comprising the first intermediate layer material, and/or in the portions comprising the second intermediate layer material By means of the above configurations, a corresponding recess or depression, the height of which and in particular the volume of which corresponds at least as far as possible to the height and volume of the embedded functional structure, may be provided in a particularly simple way in the build-up of layers that have not yet been pressed at the place at which the functional structure is to be embedded. Such recesses or grooves may only be provided thereby in either the lower layer, the intermediate layer or the upper layer or may also continue from the one layer into the respective adjacent layer (arranged vertically above), so that for example, a groove (depression) for the functional structure extends in the vertical direction from the lower layer right up to the upper layer or even right into the upper layer or from the intermediate layer right into the upper layer.

It should be noted that when reference is made to a (lower, upper, intermediate) layer, the respective layer may also have a plurality of layers. An intermediate layer may, therefore, also have one layer comprising adhesive and/or one layer comprising primer, for example. The same applies to the lower and upper layer which may also, in principle, have multiple layers.

In accordance with a further configuration, it is provided for the lower layer, in particular after the application of a primer and optionally a striping, which is provided in particular in the edge region (in relation to the transversal direction) of the build-up of layers, to be deformed or profiled in certain portions (a deformation may also be a line marking or a creasing), whereby at least one recessed portion is formed.

It can thereby be provided that a functional structure may be laid (inserted), in particular by laminating, in the respective recessed portions, in particular after the application of an adhesive in the respective recessed portion, the upper-side surface of which lies in a common plane in particular with the upper-side surface outside the recessed portion.

The functional structure may be provided with electrical contacts or bonding prior to or after being inserted in the respective recessed portion.

Finally, in accordance with a further configuration, it is provided for a protective layer, in the form of a barrier film, for example to be laminated on the functional structure, where applicable also on the electrical contacts or bonding, and/or on the build-up of layers outside the recessed portion.

The task derived and outlined above is also solved in accordance with a second gage of the present invention by a metal composite material, in particular a steel composite material with embedded functional structure, produced by a procedure as defined above.

Those having ordinary skill in the art will understand that there are a variety of options for shaping and further developing the procedure according to the present disclosure and the metal composite material according to the present disclosure.

FIGS. 1 through 5 show different exemplary configurations in which functional structures 2 are embedded in a build-up of layers 3, and this build-up of layers 3 is subsequently pressed by means of a pressing device 18, shown here schematically. The longitudinal direction is thereby identified by X and the vertical direction by Y. Below Z identifies the transversal direction.

It can be clearly seen that in all exemplary configurations the upper side of the build-up of layers 3 runs continuously parallel to the lower side of the build-up of layers 3, in spite of the embedded functional structures 2.

In all exemplary configurations, the lower layer 4 is, for example, a steel band on to which further layers are or have been laminated in a plurality of steps. The use of metal plates or metal sheets (not shown here) is also conceivable on to which further layers may be laminated in a plurality of steps.

In the exemplary configuration shown in FIG. 1, an intermediate layer 5 is applied to the lower layer 4 in the form of a carrier film, wherein recesses 7 are embedded in portions 5a, which are spaced from one another in the longitudinal direction X. The recesses 7 are formed thereby by a reduction of the cross-section within section 5a of the intermediate layer 5. A functional structure 2 is inserted respectively in the recesses 7. In the vertical direction Y, the totality comprising intermediate layer 5 and functional structures 2 is covered in an upward direction by an upper layer 6, here in the form of a transparent protective film. The thickness of the upper layer 6 and the lower layer 4 respectively is thereby constant before the pressing and after the pressing. The pressing causes a steel composite material 1 to be produced in which functional structures 2 are embedded in portions 3a of the build-up of layers 3.

Figure 2:
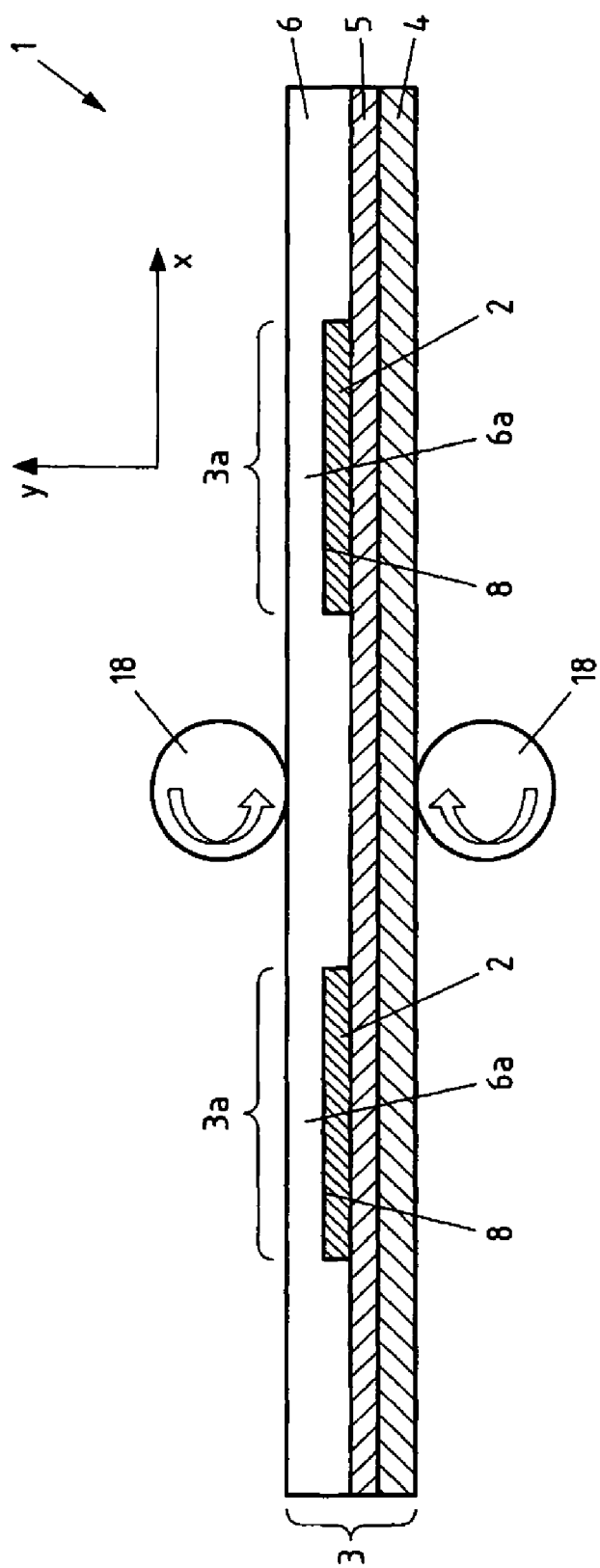
FIG. 2 is a cross-sectional view of an example build-up of layers where a recess is formed by a reduction of a cross-section in portions of an upper layer.

FIG. 2 shows an exemplary configuration in which, in contrast to the exemplary configuration in FIG. 1, a recess 8 is formed by a reduction of the cross-section in portions 6a of the upper layer 6. This recess 8 serves to accommodate the respective functional structures 2. In this case, the thickness of the lower layer 4 and the intermediate layer 5 is constant in each case.

Figure 3:
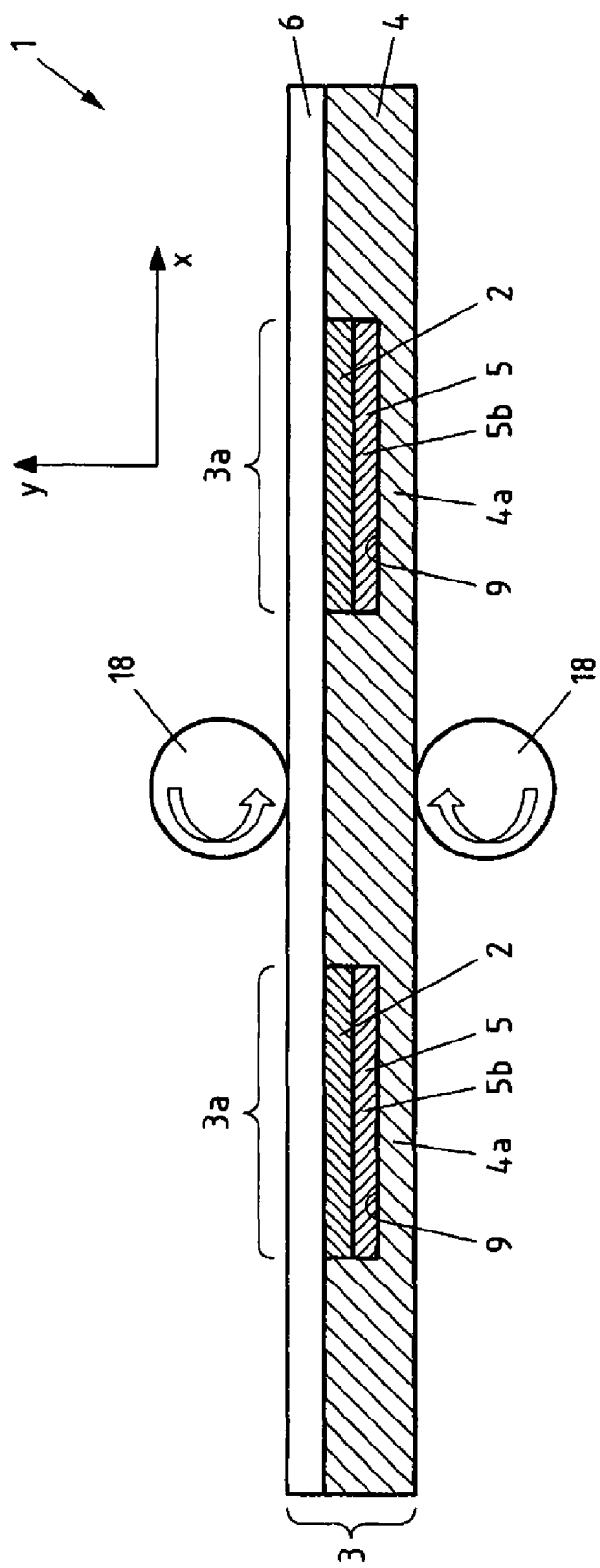
FIG. 3 is a cross-sectional view of an example build-up of layers where portions have a reduction in cross-section in a lower layer through which a recess is formed.

In the exemplary configuration in FIG. 3, portions 4a are provided with a reduction in the cross-section in the lower layer 4 through which a recess 9 is formed. The intermediate layer 5, namely in the form of material portions 5b, is then arranged in the recess (9) at the very bottom, in relation to the vertical direction Y, and over this respectively a functional structure 2 is arranged. The totality comprising the bottom layer 4, sections 5b of the intermediate layer 5 and functional structures 2 is covered in the vertical direction in an upward direction by the upper layer 6 which has a constant thickness over its entire extent in the longitudinal direction X.

Figure 4:
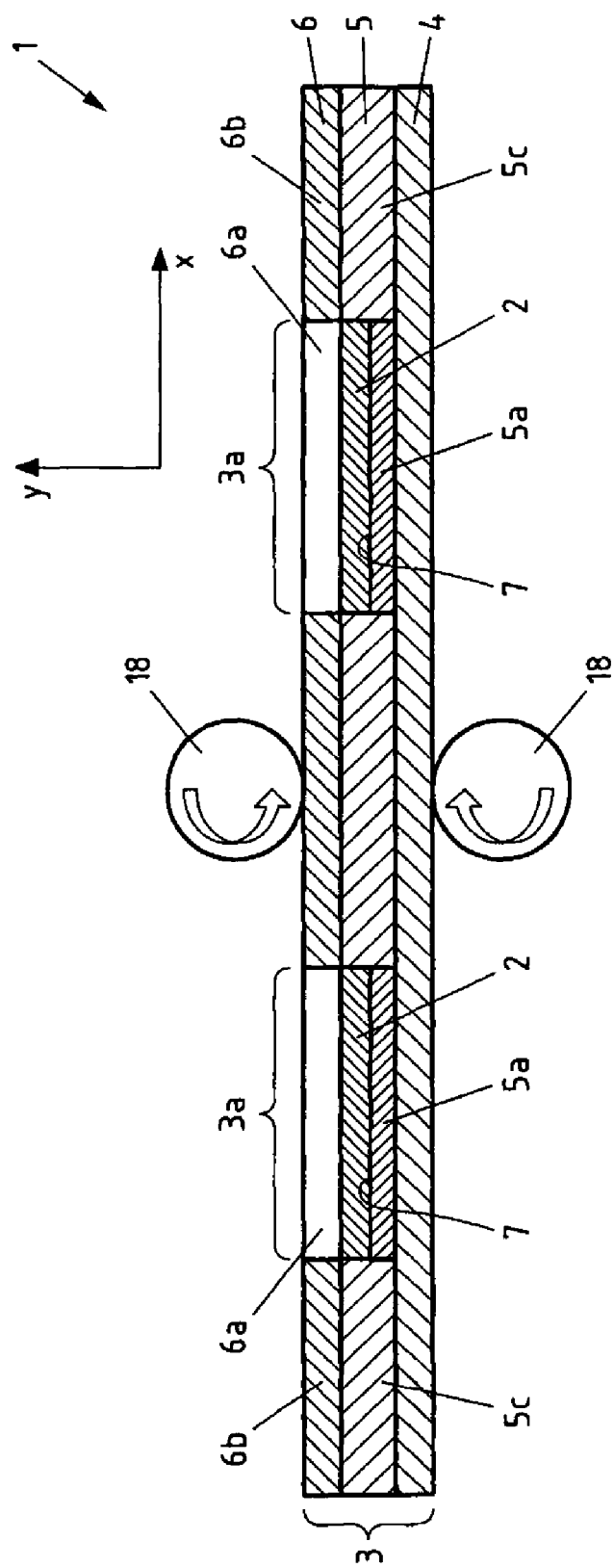
FIG. 4 is a cross-sectional view of an example build-up of layers where a lower layer has a constant thickness and an intermediate layer with thinner portions and thicker portions is disposed over the lower layer.

In the exemplary configuration in FIG. 4, the lower layer has a constant layer thickness. An intermediate layer 5 with thinner portions 5a and thicker portions 5c is then arranged over this, said layer may consist respectively of the same or a different intermediate layer material. Through the provision of thinner portions 5a of the intermediate layer 5, a reduction of the cross-section is inevitably provided in these portions 5a with respect to portions 5c, through which reduction of the cross-section recesses 7 are also formed here in the intermediate layer 5. As in the exemplary configuration in FIG. 1, the recesses 7 are filled by a functional structure 2 in each case. The totality comprising first portions 5a and second portions 5c of the intermediate layer 5 and functional structures 2 is covered in the vertical direction Y in an upward direction by an upper layer 6 which, in this exemplary configuration, also consists of first portions 6a and second portions 6b. The portions 6a of the upper layer 6 lie exactly over the portions 5a of the intermediate layer 5 and align with them (have the same demarcations in the longitudinal direction X and transversal direction Z). The first portions 6a of the upper layer 6 consist here of a transparent first material, in particular plastic. The portions 6b also consist here of steel or steel band. In this case as well, the upper side of the build-up of layers 3 is arranged over the entire extent in the longitudinal direction X parallel to the underside of the build-up of layers 3.

Figure 5:
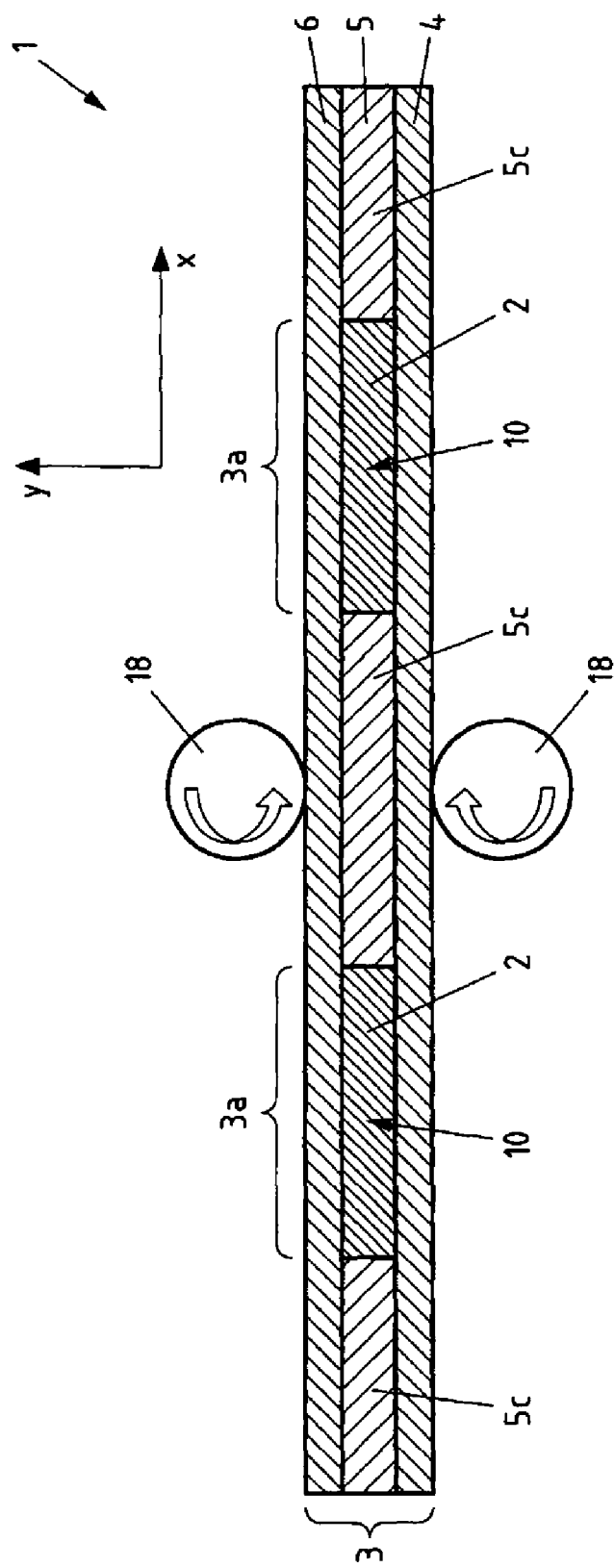
FIG. 5 is a cross-sectional view of an example build-up of layers where a lower layer and an upper layer each include a steel band.

In accordance with the exemplary configuration in FIG. 5, the lower layer 4 and the upper layer 6 consist in each case of a steel band. The intermediate layer 5 consists of portions 5c, in this case for example of plastic, that are spaced from each other in the longitudinal direction X. In the areas in between, depressions 10 are provided between the lower layer 4 and the upper layer 6, said depressions being filled completely here by functional structures 2.

It should be noted that here in the exemplary configurations of FIGS. 4 through 5, a plurality of functional structures 2 is embedded in the build-up of layers 3 spaced from each other in the longitudinal direction X. However, it is also conceivable that a single continuous functional structure be provided in the longitudinal direction, wherein corresponding recesses 7, 8 and/or 9 are then also provided continuously in the longitudinal direction X in the respective layers 4, 5 and/or 6, but are then necessarily demarcated in the transversal direction Z (by the material of the respective layer). In the latter case (continuous recess and continuous functional layer in the longitudinal direction), the recess and the functional layer each have a smaller width than the individual layer 4, 5 and 6 of the build-up of layers 3, or combinations of the two. It is also conceivable but not shown that an already preformed or profiled metal substrate be provided as the lower layer, which may, for example, have a hat-shaped profile (open profile) and a functional structure may essentially completely fill the open profile, wherein the demarcation in the transversal direction as well as in the vertical direction is provided by protruding areas of the hat-shaped profile. An upper layer which finishes flush with the ends of the protruding area may, therefore, completely cover the functional layer.

In FIGS. 6 through 12, individual process steps of a production procedure according to the invention are described as an example.

Figure 6:
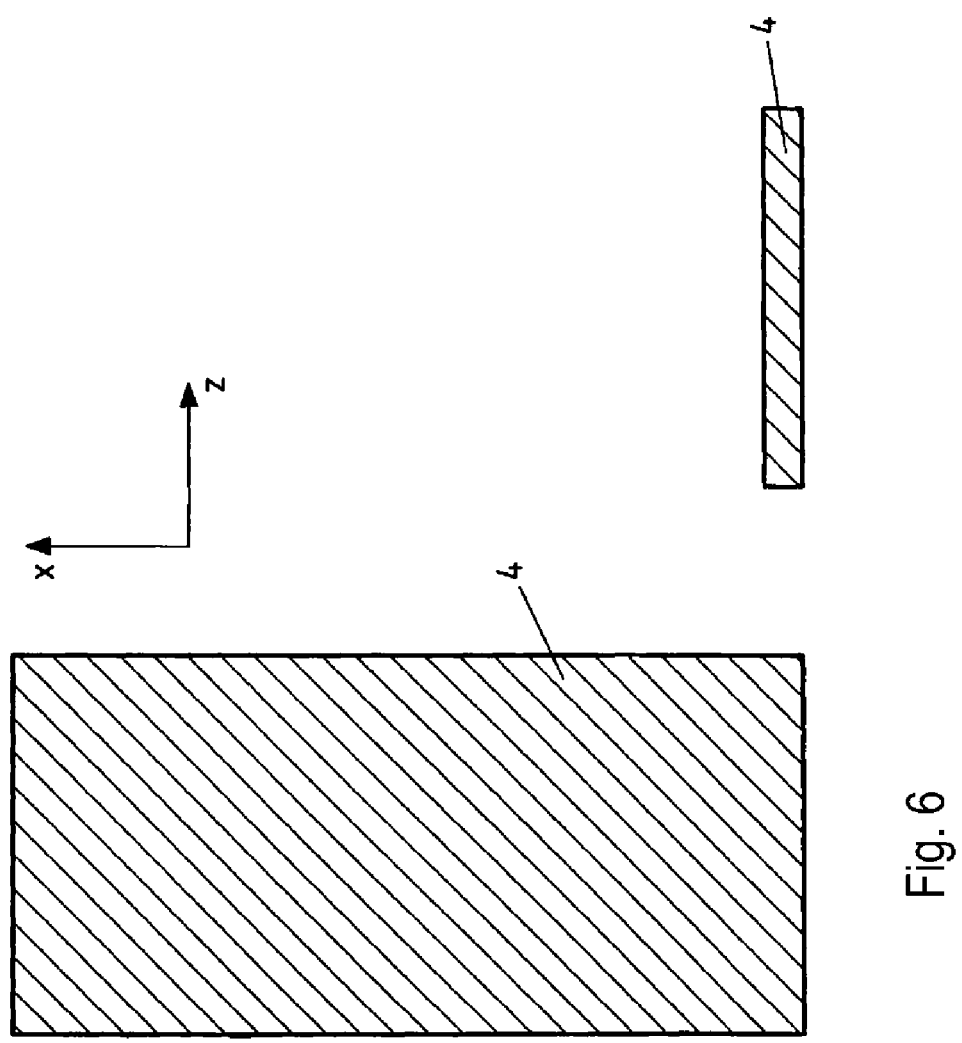
FIG. 6 is a schematic view illustrating a step of an example production procedure where a galvanized flat steel is transported as a lower layer in a production direction or a longitudinal direction.
Figure 7:
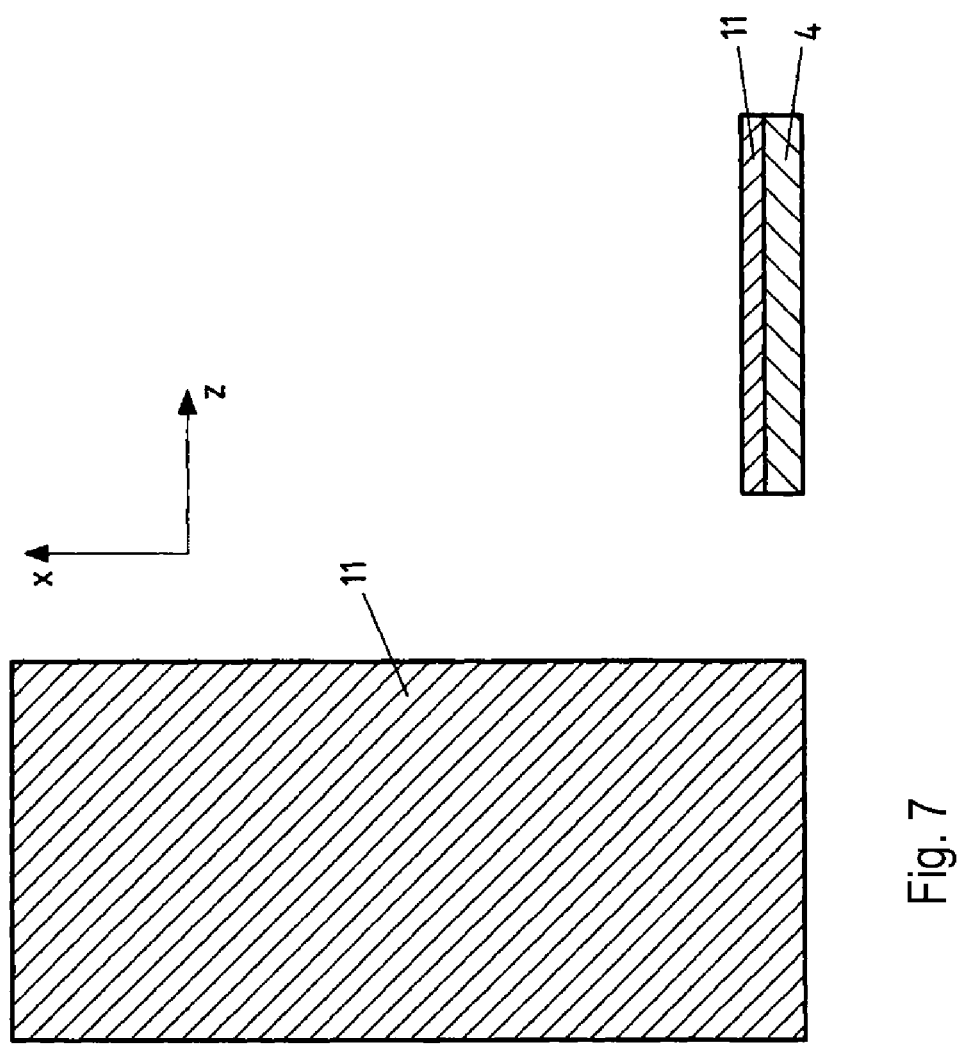
FIG. 7 is a schematic view illustrating a step of an example production procedure where a primer is applied over an entire area of a flat steel.
Figure 8:
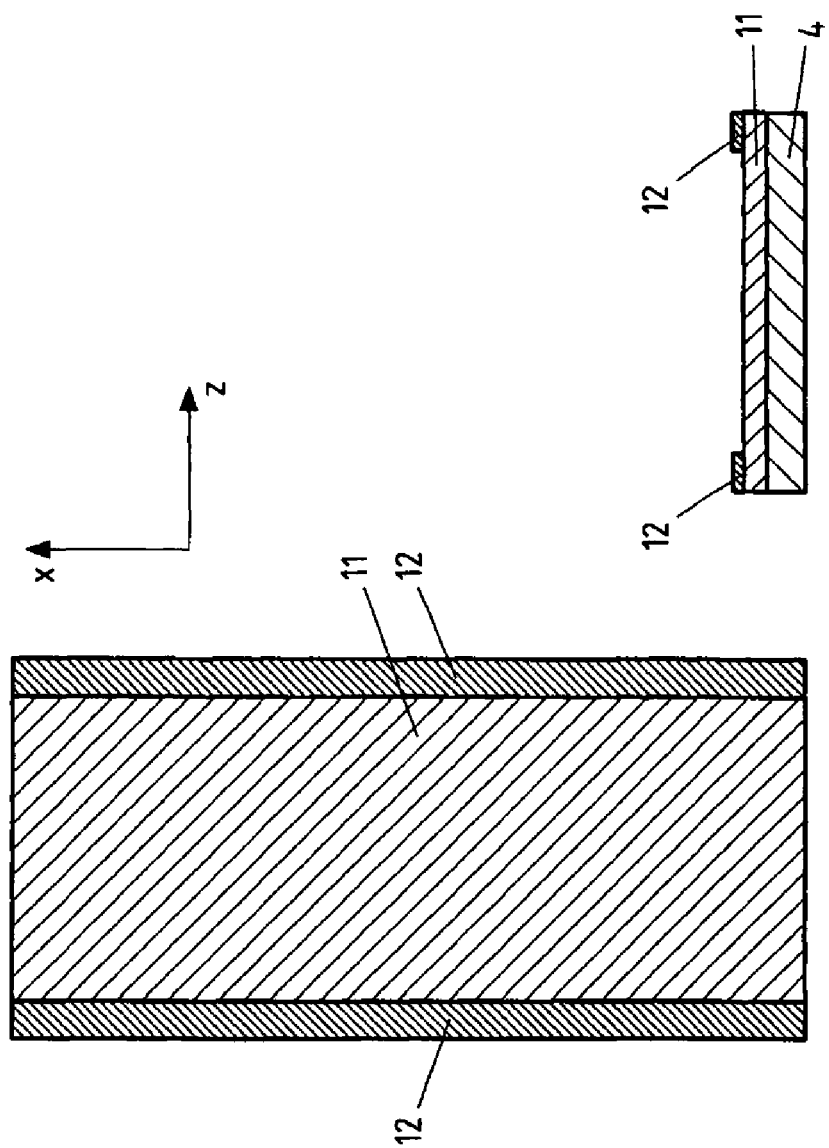
FIG. 8 is a schematic view illustrating a step of an example production procedure where a striping is applied to primer in edge areas of a flat steel.
Figure 9:
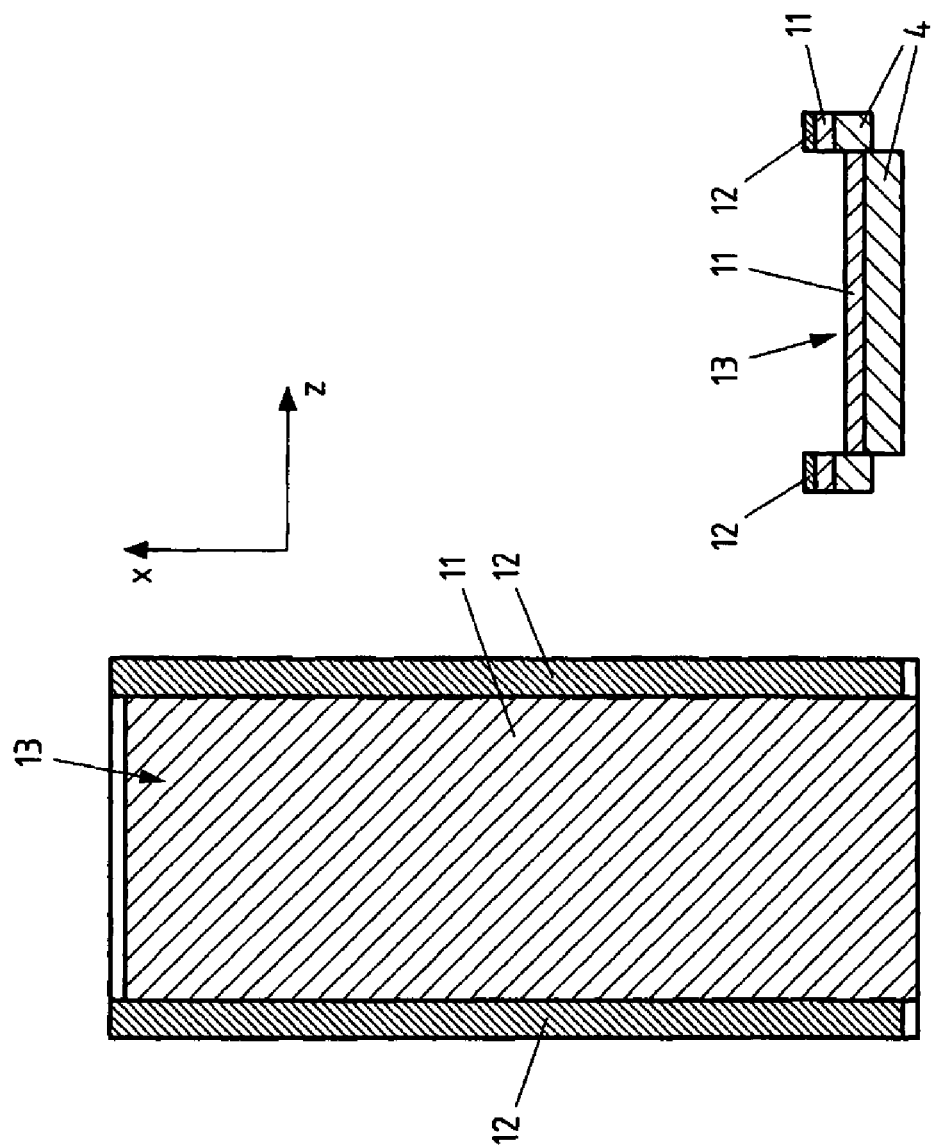
FIG. 9 is a schematic view illustrating a step of an example production procedure where a flat steel with primer is deformed or profiled in an area between painted stripes.
Figure 10:
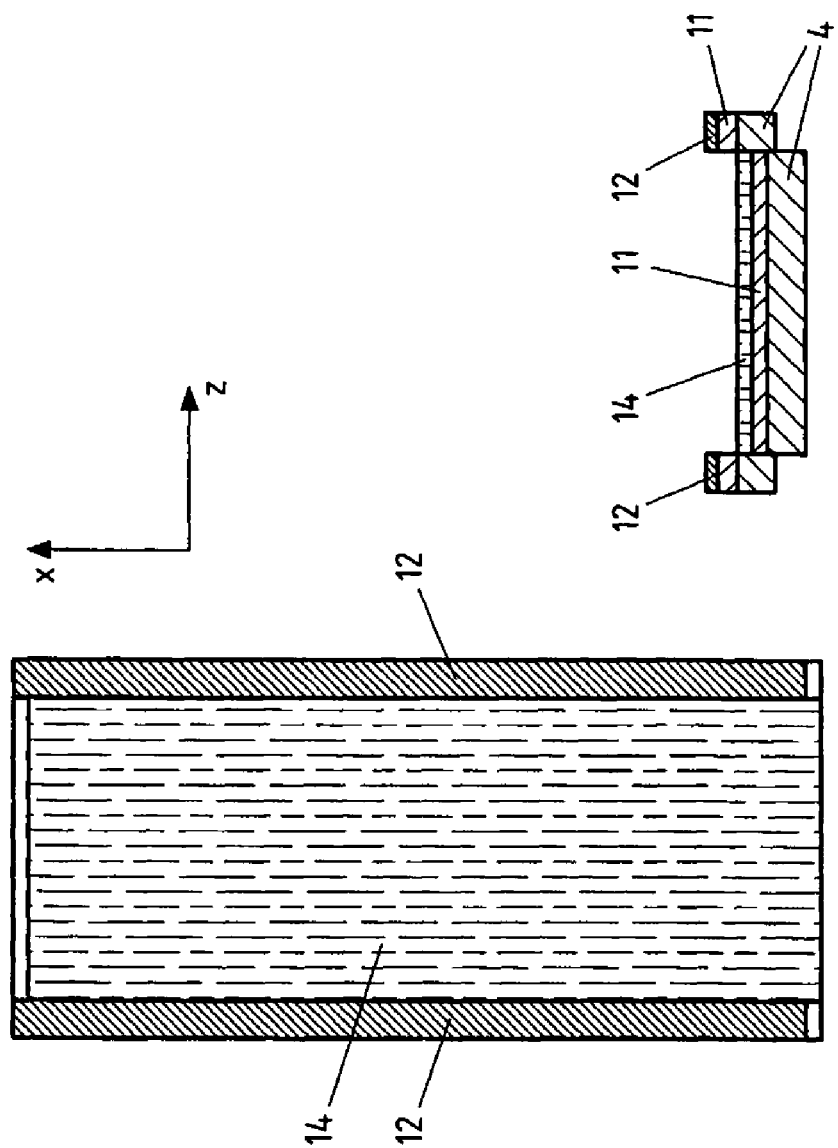
FIG. 10 is a schematic view illustrating a step of an example production procedure where an adhesive is applied to primer in a recess.
Figure 11:
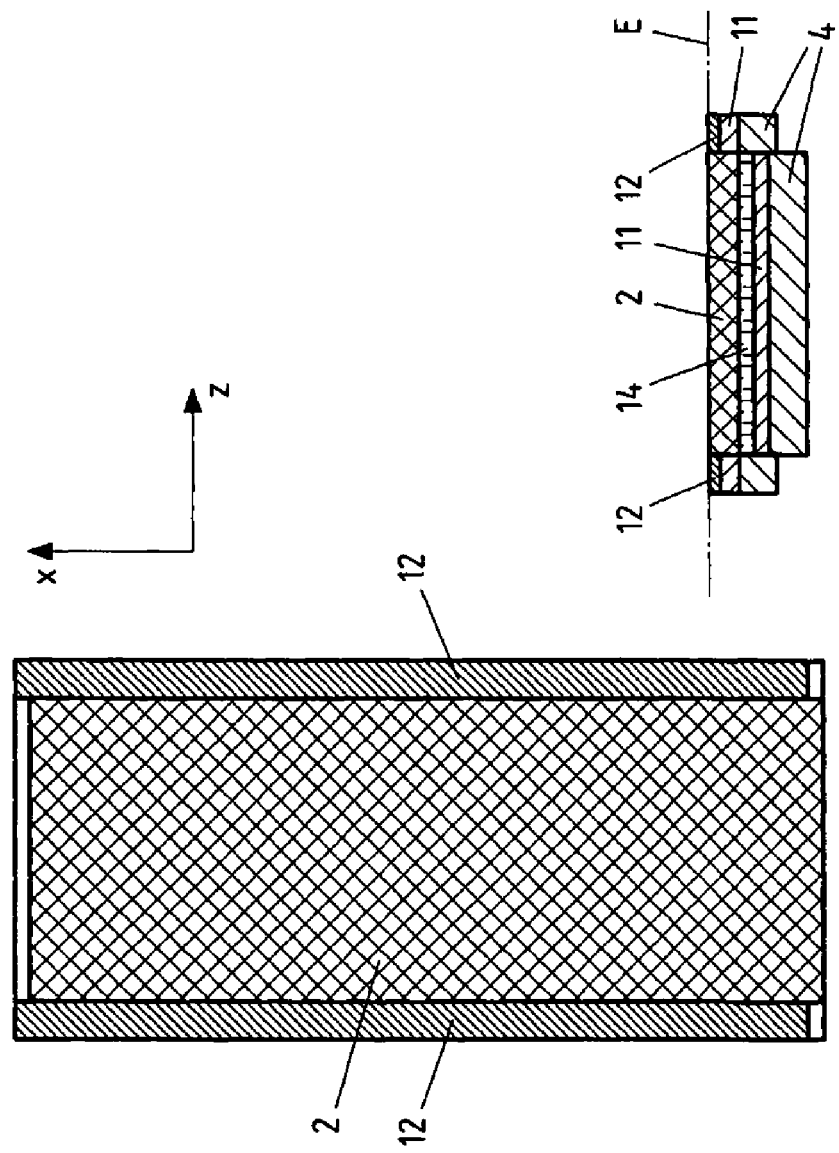
FIG. 11 is a schematic view illustrating a step of an example production procedure where a functional structure is laminated on an adhesive applied to primer on flat steel.
Figure 12:
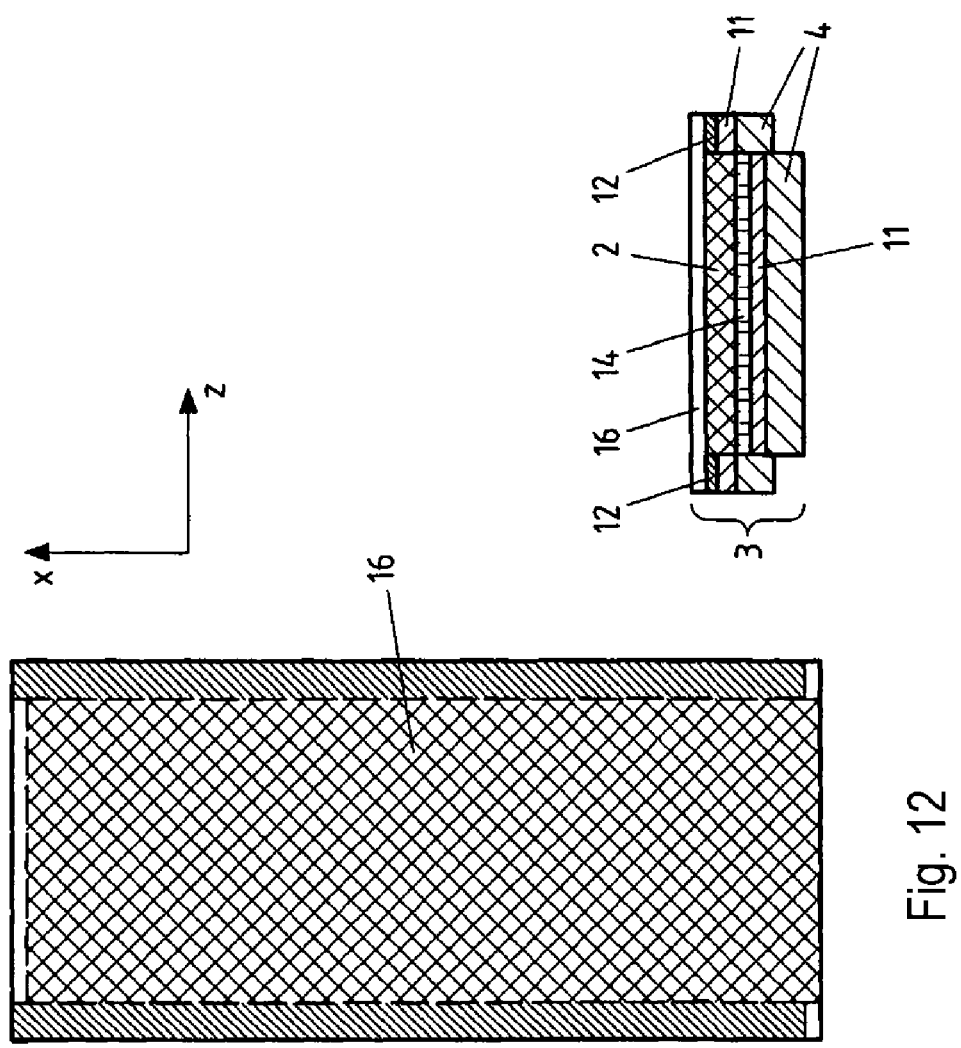
FIG. 12 is a schematic view illustrating a step of an example production procedure where a protective film is applied.

In FIG. 6, for example, a galvanized flat steel is first transported as lower layer 4 in the production direction or longitudinal direction X. In accordance with FIG. 7, a primer 11 is applied over the entire area, said primer forming part of the previously described intermediate layer 5 of the subsequent build-up of layers 3. In accordance with FIG. 8, a striping 12 is then applied to the primer in the edge areas, said striping also forming part of the intermediate layer 5. In accordance with FIG. 9, the flat steel 4 furnished with the primer 11 is deformed or profiled in the area between the painted stripes 12, whereby a recess 13 is formed between the painted stripes 12. The deformation or profiling also causes a misalignment between a middle portion and edge portions of the lower layer 4 and the primer layer 11. In accordance with FIG. 10, an adhesive 14 is then applied to the primer 11 in the recess 13, said adhesive also forming part of the intermediate layer 5 of the subsequent build-up of layers 3. In accordance with FIG. 11, a functional structure 2 is then laminated on to the adhesive, wherein the upper-side surface of the functional structure 2 and the upper-side surface of the areas of the build-up of layers lying outside the recess 13, in this case, therefore, the painted stripes 12, lie in a common plane E. In accordance with FIG. 12, another protective film 16 in the form of a barrier film is finally applied, said film forming the upper layer 6 of the now complete build-up of layers 3 in this exemplary configuration.

Alternative process steps of a production procedure according to the invention are now described with the aid of FIGS. 13 through 18.

Figure 13:
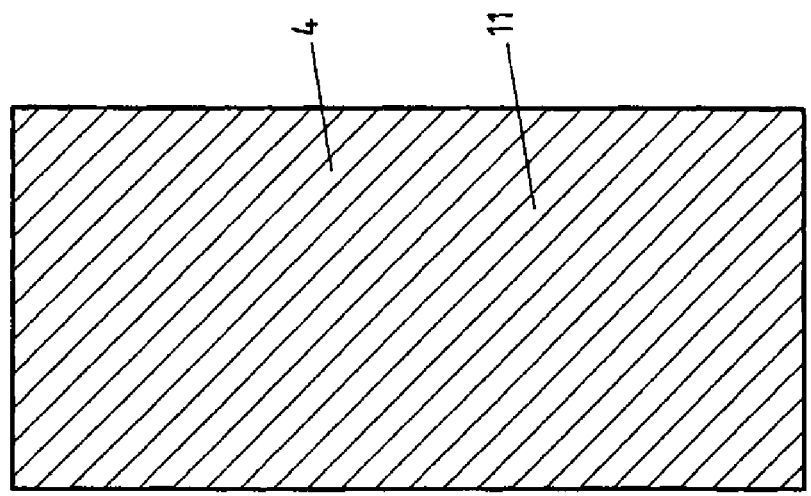
FIG. 13 is a schematic view illustrating a step of an example production procedure where a galvanized flat steel is provided, the galvanized flat steel being plaited and furnished with a primer layer.
Figure 14:
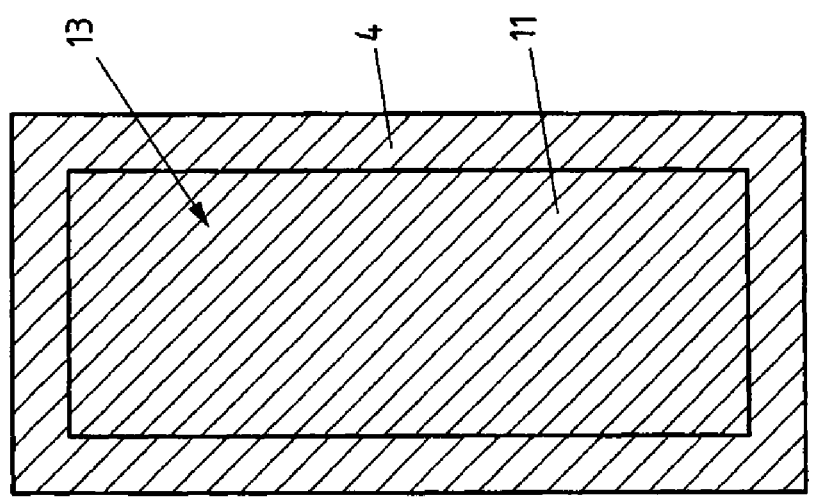
FIG. 14 is a schematic view illustrating a step of an example production procedure where an area of a lower layer is pressed such that a recess forms.
Figure 15:
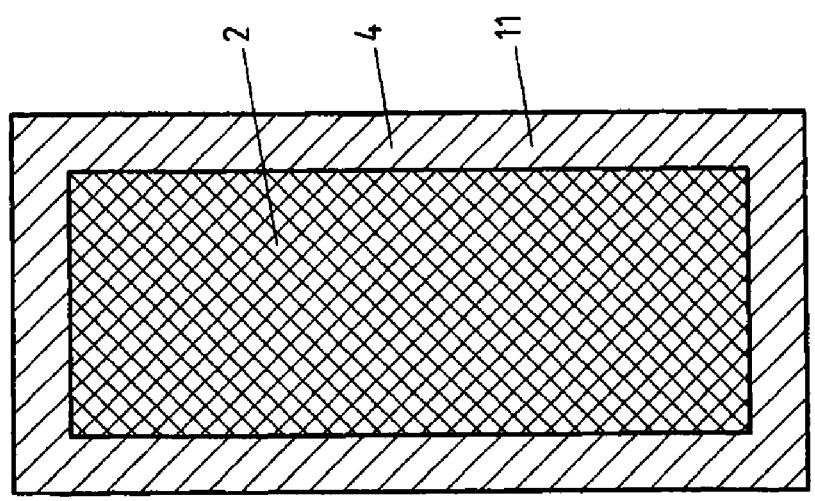
FIG. 15 is a schematic view illustrating a step of an example production procedure where a functional structure with pressure-sensitive adhesive tape is inserted into a recessed area.
Figure 16:
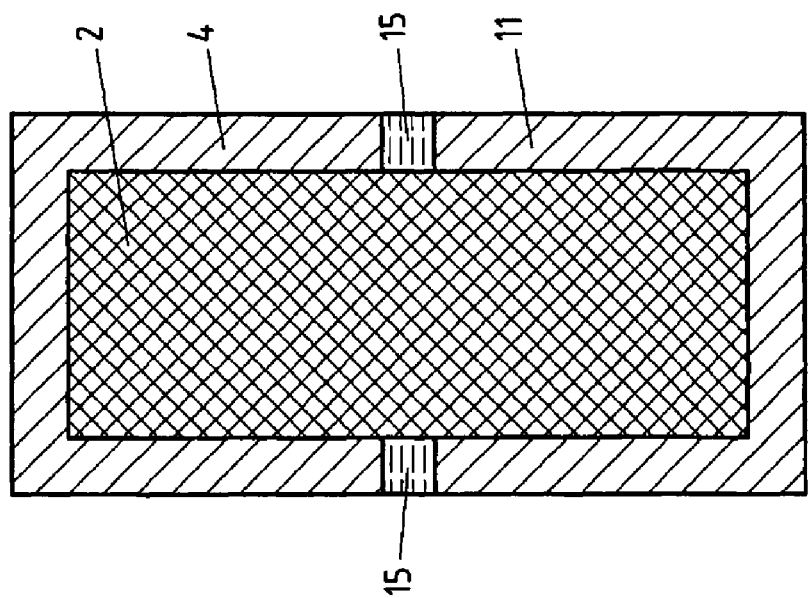
FIG. 16 is a schematic view illustrating a step of an example production procedure involving a functional structure with flat electrical bonding.
Figure 17:
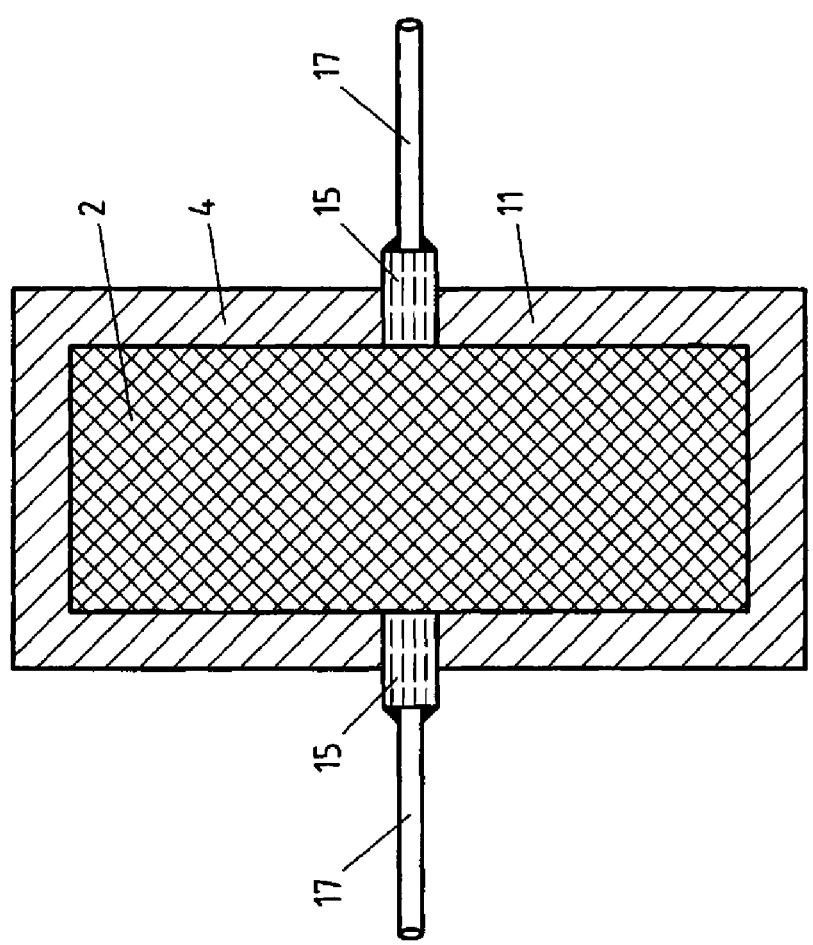
FIG. 17 is a schematic view illustrating a step of an example production procedure where electrical conductors may be applied, wherein a flat cable segues into a cylindrical cable.
Figure 18:
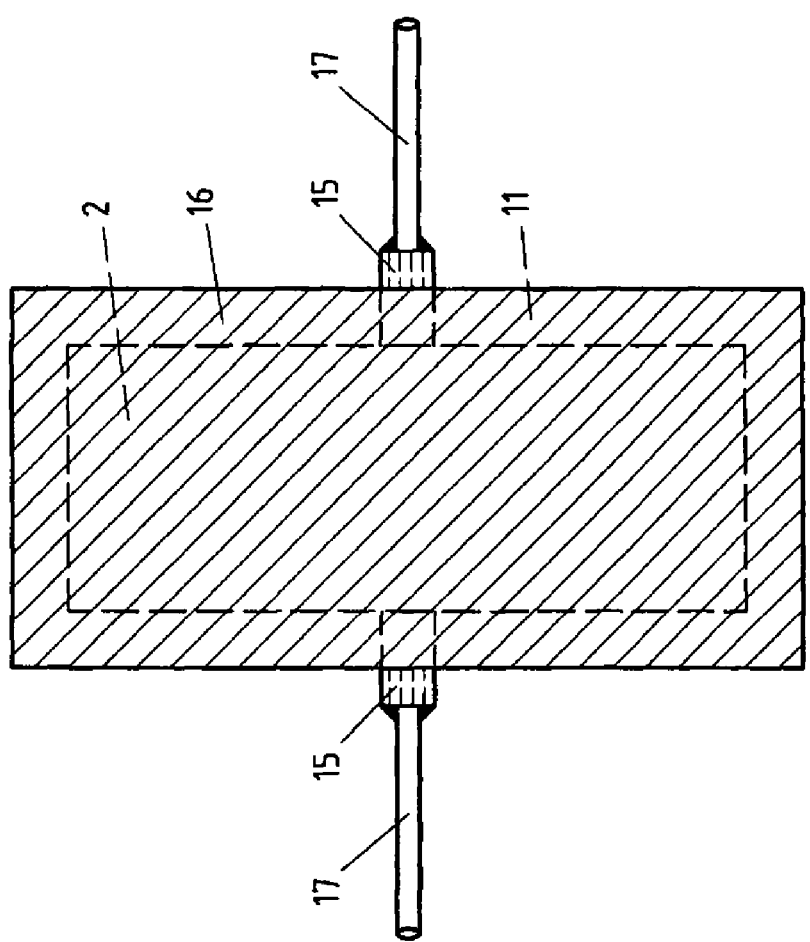
FIG. 18 is a schematic view illustrating a step of an example production procedure where a self-adhesive protective film may be applied to cover a functional structure and a primer layer and part of a bonding in an edge area.

In accordance with FIG. 13, for example, a galvanized flat steel is first provided that is plaited and furnished with a primer layer 11. In accordance with FIG. 14, an area of the lower layer 4 is then pressed whereby a recess 13 is formed. In accordance with FIG. 15, a functional structure 2, which is already furnished with pressure-sensitive adhesive tape on its underside ( ) is inserted into the recessed area 13. FIG. 16 shows a variation of FIG. 15, in which the inserted functional layer already contains flat electrical bonding 15 that protrude over the functional area 2, wherein the area of the bonding 15 in this case was also covered by the recess 13 previously created by pressing. In accordance with FIG. 17, electrical conductors (electricity supply or drain) may then be applied, wherein a flat cable segues into a cylindrical cable 17. Finally, as shown in FIG. 18, a self-adhesive protective film 16 may optionally be applied, which then covers the functional structure 2 and the primer layer 11 and part of the bonding 15 in the edge area.

Exemplary applications of the steel composite material with embedded functional structures according to the invention are:

Photovoltaics: Organic photovoltaics (OPV), Hybrid OPV (HOPV), Solid state dye solar cells (ss-DSC), Perovskite-based solar cells, Thin-film silicon (a-Si), CIGS/CIS/CZTS solar cells, CdTe solar cells Organic light-emitting diodes (OLED)

LED embedded with conductor tracks in a flexible matrix (e.g. Silicon)

Light Emitting Electrochemical Cell (LEC)

Phosphorescent films

Thin-film displays, e.g. AMOLED

Surface sensors (pressure sensors, touch-sensitive sensors (capacitive) etc.)

(printed) flat batteries (TFB=thin film battery)

The following are named as application examples:
Building-integrated photovoltaics (BIPV); "energy harvester" on/off grid
Surface lighting (LED/OLED/LEC, orientation guides, emergency lighting)
Visual information (TFT, LCD, AMOLED display)
Sensor mat in the floor registers people through pressure
Touchpad, Touch display
Integrated energy storage

What is claimed is:

1. A method for producing a metal composite material with an embedded functional structure, in which a build-up of layers disposed one on top of another in a vertical direction is produced and pressed, wherein the build-up of layers is produced by:
providing a lower layer comprising a metal substrate;
positioning at least in a recessed portion in the lower layer an intermediate layer that is in contact with the lower layer;
applying a primer to the lower layer;
deforming the lower layer to form the recessed portion by misaligning a middle portion and edge portions of the lower layer and the primer,
positioning a functional structure in the recessed portion of the lower layer; and positioning an upper layer over the lower layer in the vertical direction; wherein
before the build-up of layers is pressed, the recessed portion of the lower layer with the functional structure has a thickness equal to that of a remainder of the build-up of layers, the intermediate layer includes a first portion comprising a first intermediate layer material and adjacent thereto a second portion comprising a second intermediate layer material that is different than the first intermediate layer material; the upper layer includes a first portion comprising a first upper layer material and transversally adjacent thereto a second portion comprising a second upper layer material that is different than the first upper layer material; the first portion of the intermediate layer and the second portion of the intermediate layer are adjacent to each other; and the first portion of the upper layer and the second portion of the upper layer are adjacent to each other.

2. The method of claim 1, wherein producing the build-up of layers further comprises positioning the upper layer over the functional structure in the vertical direction.

3. The method of claim 1, wherein positioning the functional structure in the recessed portion of the lower layer comprises: arranging the functional structure atop the intermediate layer, wherein the intermediate layer and the functional structure are disposed in the recessed portion formed by a reduction of a thickness of the lower layer, wherein a thickness of the upper layer is constant.

4. The method of claim 1, wherein the first upper layer material and/or the second upper layer material is transparent.

5. The method of claim 1, further comprising inserting the functional structure into the recessed portion of the lower layer such that an upper-side surface of the functional structure lies in a common plane with an upper-side surface of the build-up of layers outside the recessed portion.

6. The method of claim 5, wherein the functional structure includes electrical contacts.

7. The method of claim 5, further comprising laminating a protective layer on at least one of the functional structure or the build-up of layers outside the recessed portion.

8. A method for producing a metal composite material with an embedded functional structure, in which a build-up of layers disposed one on top of another in a vertical direction is produced and pressed, wherein the build-up of layers is produced by:
providing a lower layer comprising a metal substrate;
positioning at least in a recessed portion in the lower layer an intermediate layer that is in contact with the lower layer;
positioning a functional structure in the recessed portion of the lower layer; and
positioning an upper layer over the lower layer in the vertical direction, wherein:
before the build-up of layers is pressed, the recessed portion of the lower layer with the functional structure has a thickness equal to that of a remainder of the build-up of layers; the intermediate layer includes a first portion comprising a first intermediate layer material and adjacent thereto a second portion comprising a second intermediate layer material that is different than the first intermediate layer material; the upper layer includes a first portion comprising a first upper layer material and transversally adjacent thereto a second portion comprising a second upper layer material that is different than the first upper layer material; the first portion of the intermediate layer and the second portion of the intermediate layer are adjacent to each other; and the first portion of the upper layer and the second portion of the upper layer are adjacent to each other.

9. The method of claim 8, wherein the first upper layer material comprises a plastic film, or the second upper layer material comprises flat steel.

10. The method of claim 8, wherein: the first portion of the intermediate layer and the upper layer are aligned and are positioned one on top of the other in the vertical direction; the functional structure is positioned in the vertical direction between the first portion of the intermediate layer and at the first portion of the upper layer; and the functional structure is in contact with the first portion of the intermediate layer and the first portion of the upper layer.

11. The method of claim 8, wherein at least one of the first intermediate layer material or the second intermediate layer material comprises a plastic film or a flat steel.

* * * * *